(12) United States Patent
Kim

(10) Patent No.: US 7,429,839 B2
(45) Date of Patent: Sep. 30, 2008

(54) LINEAR COMPRESSOR AND CONTROL METHOD THEREOF

(75) Inventor: Hyo-suk Kim, Hwasung-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 490 days.

(21) Appl. No.: 11/030,434

(22) Filed: Jan. 7, 2005

(65) Prior Publication Data
US 2005/0152794 A1 Jul. 14, 2005

(30) Foreign Application Priority Data
Jan. 9, 2004 (KR) ............... 10-2004-0001447

(51) Int. Cl.
*H02K 41/00* (2006.01)
(52) U.S. Cl. ............... 318/135; 310/10; 310/12; 310/15
(58) Field of Classification Search ............... 318/135
See application file for complete search history.

(56) References Cited

U.S. PATENT DOCUMENTS

| | | | | |
|---|---|---|---|---|
| 4,804,913 A * | 2/1989 | Shimizu et al. | ........ | 324/207.23 |
| 4,966,533 A * | 10/1990 | Uchida et al. | ............. | 417/413.1 |
| 6,176,683 B1 * | 1/2001 | Yang | ........................ | 417/44.1 |
| 6,812,597 B2 * | 11/2004 | McGill et al. | ................. | 310/12 |
| 6,954,040 B2 * | 10/2005 | McGill et al. | ............... | 318/127 |
| 7,001,154 B2 * | 2/2006 | Kim | ........................ | 417/212 |
| 7,090,470 B2 * | 8/2006 | Kim | ........................ | 417/44.11 |
| 7,285,878 B2 * | 10/2007 | McGill et al. | ................. | 310/12 |

(Continued)

FOREIGN PATENT DOCUMENTS

CN 1403709 A 3/2003

(Continued)

OTHER PUBLICATIONS

The First Office Action issued by the State Intellectual Property Office of People's Republic of China on Jun. 8, 2007 in the corresponding Chinese Application No. 200510004035.3 (5 pages) (English translation consisting of 3 pages).

(Continued)

*Primary Examiner*—Lincoln Donovan
*Assistant Examiner*—Michael Brandt
(74) *Attorney, Agent, or Firm*—Staas & Halsey LLP

(57) ABSTRACT

A linear compressor having a reciprocating piston, a linear motor driving the piston, and a motor controller to vary magnitude of a stroke of the piston according to power, including: a near-collision detector detecting whether the piston passes a near-collision position spaced from a top dead center according to a predetermined high power with a predetermined high power distance; and a collision return time calculator calculating a near-collision position return time taking for the piston to return to the near-collision position on a basis of the detection of the near-collision detector according to compression and expansion cycles, and wherein the motor controller decreases a driving force of the linear motor if the near-collision position return time is greater than a predetermined allowance time per power, and increases the driving force of the linear motor if the near-collision position return time is less than the predetermined allowance time per power.

22 Claims, 18 Drawing Sheets

U.S. PATENT DOCUMENTS

| | | | |
|---|---|---|---|
| 2003/0118460 A1* | 6/2003 | Lilie et al. | 417/415 |
| 2003/0161734 A1* | 8/2003 | Kim | 417/44.1 |
| 2005/0008511 A1* | 1/2005 | Kim | 417/416 |
| 2005/0069417 A1* | 3/2005 | Kim | 417/1 |
| 2005/0168179 A1* | 8/2005 | McGill et al. | 318/119 |
| 2007/0152512 A1* | 7/2007 | Tian et al. | 310/12 |

FOREIGN PATENT DOCUMENTS

| | | |
|---|---|---|
| JP | 2000-110732 | 4/2000 |
| JP | 2001-090661 | 4/2001 |
| JP | 2003-65244 | 3/2003 |
| JP | 2003-254251 | 9/2003 |
| KR | 10-273453 | 9/2000 |
| KR | 2001-37186 | 5/2001 |
| KR | 10-351155 | 8/2002 |
| KR | 2003-71359 | 9/2003 |

OTHER PUBLICATIONS

Details of First Office Action for Application No. 200510004035.3 (6 pages) with formal drawings attached thereto (5 pages) (English translation consisting of 5 pages).

European Search Report transmitted by the European Patent Office in Application No. 05250058.4—2315 dated Sep. 22, 2006 (3 pages).

* cited by examiner

LINEAR COMPRESSOR AND CONTROL METHOD THEREOF

CROSS-REFERENCE TO RELATED APPLICATION

This application claims the benefit of Korean Patent Application No. 2004-0001447, filed Jan. 9, 2004, in the Korean Intellectual Property Office, the disclosure of which is incorporated herein by reference.

BACKGROUND OF THE INVENTION

1. Field of the Invention

The present invention relates to a linear compressor and a control method thereof which can control the reciprocal movement of a piston more accurately.

2. Description of the Related Art

A linear compressor is widely used to compress coolant in a cooling cycle of a refrigerator. The linear compressor measures a magnitude of a stroke of a piston, and adjusts current applied to a driving motor on a basis of the measured stroke magnitude to control an operation of the piston. FIG. 1 is a cross-sectional view of a sensor structure for detecting a position of the piston of a conventional linear compressor. As shown in FIG. 1, a sensor structure for a position detection comprises a sensor body 100, sensor coils 101A and 101B, a core support 102 and a core 103.

The sensor coils 101A and 101B and a position detection circuit (not shown) are provided in an inside of the sensor body 100. The sensor coils 101A and 101B comprises a first sensor coil 101A, and a second sensor coil 101B connected in serial to each other with a same inductance value, a same size, a same number of turns. The core support 102, supporting the core 103, is connected to the piston (not shown) and made of non-magnetic material.

The core 103 reciprocates while passing through an inner hollow of the sensor body 100 as the piston reciprocates. With a movement of the core 103, a predetermined inductance is induced in the sensor coils 101A and 101B.

FIG. 2 illustrates a schematic connection configuration of the position detection circuit of the piston of the conventional linear compressor. As shown in FIG. 2, the position detection circuit comprises the sensor coils 101A and 101B, distributing resistors Ra and Rb, a source power 105, an amplifier 104, and an analog signal processor 106.

The sensor coils 101A and 101B connected in serial and the distributing resistors Ra and Rb connected in serial are connected in parallel. The source power 105 applies a triangle wave to a connection point of the sensor coils 101A and 101B and the distributing resistors Ra and Rb.

The amplifier 104 is inputted with and amplifies voltage distributed by the sensor coils 101A and 101B and the distributing resistors Ra and Rb to measure the inductance induced in the sensor coils 101A and 101B. The analog signal processor 106 detects a position of the piston through a predetermined signal processing after receiving an output wave of the amplifier 104.

The linear compressor measures a variation of the voltage caused by the induced inductance according to the reciprocal movement of the core 103 with centering a middle point of the sensor coils 101A and 101B. Also, it estimates a top origin of the piston on a basis of the output voltage measured by the position detection circuit to control a driving force of a motor.

However, the output voltage of the position detection circuit of the conventional linear compressor does not have a linear property in which the output voltage is proportional to the position of the piston because of a length of the core 103, temperature, pressure, and a heat noise of a circuit. As shown in FIG. 3, the output voltage of the amplifier has a response property represented by a line 'a' in a normal operation. However, if it has a response property represented by a line 'b' because of an external influence, there could be a problem that the piston collides with a valve in a high power operation as the measured position of the piston differs from an actual position of the piston.

SUMMARY OF THE INVENTION

It is an aspect of the present invention to provide a linear compressor capable of controlling a reciprocal movement of a piston accurately.

According to an aspect of the invention, a linear compressor comprises a reciprocating piston, a linear motor driving the piston, a motor controller controlling the linear motor to vary magnitude of a stroke of the piston according to power,; comprising: a near-collision detector detecting whether the piston passes a near-collision point spaced from a top dead center according to a predetermined high power with a predetermined high power distance; and a collision return time calculator calculating a near-collision point return time taken for the piston to return to the near-collision point on a basis of the detection of the near-collision detector according to compression and expansion cycles, wherein the motor controller decreases a driving force of the linear motor if the near-collision point return time is greater than a predetermined allowance time per power, and increases the driving force of the linear motor if the near-collision point return time is less than the predetermined allowance time per power when controlling according to the high power.

According to an aspect of the invention, the linear compressor further comprises an entry point detector detecting whether the piston passes an entry point detection point spaced from the top dead center according to a predetermined low power with a predetermined low power distance; and an entry return time calculator calculating an entry detection point return time taken for the piston to return to the entry detection point according to the compression and expansion cycles on a basis of the detection of the entry point detector, wherein the motor controller decreases the driving force of the linear motor in a case that the entry detection point return time is greater than a predetermined criterion time per power, and increases the driving force of the linear motor in a case that the entry detection point return time is less than the criterion time.

According to an aspect of the invention, the linear compressor according to claim 1, further comprising a core to detect a position of the piston, wherein the near-collision detector detects whether the piston passes the near-collision point by detecting a position of the core.

According to an aspect of the invention, the near-collision detector comprises: an upper sensor coil and a lower sensor coil induced with variable inductance according to a reciprocal movement of the core and spaced with a predetermined distance from each other; and a position detector detecting the position of the core by measuring the inductance.

According to an aspect of the invention, if the piston passes the near-collision point, the core is approximately positioned in a middle point of the predetermined distance between the upper sensor coil and the lower sensor coil.

According to an aspect of the invention, a length of a movement of the core is a predetermined length shorter than a length being parallel to a movement direction of the core and extending from a first side of the upper sensor coil to a first side of the lower sensor coil.

According to an aspect of the invention, the length of the movement of the core is one half of the length being parallel to the movement direction of the core and extending from the first side of the upper sensor coil to the first side of the lower sensor coil.

According to an aspect of the invention, the position detector comprises: an upper resistor connected to the first side of the upper sensor coil; a lower resistor connected to the first side of the lower sensor coil; a source power applying a predetermined power to a second side of the upper sensor coil and a second side of the lower sensor coil; and a voltage comparator inputted with respective voltages applied to the upper resistor and to the lower resistor, and the collision return time calculator calculates the near-collision point return time on a basis of output of the voltage comparator.

According to an aspect of the invention, the linear compressor further comprises a core to detect a position of the piston, and the entry point detector detects whether the piston passes the entry detection point by detecting the position of the core.

According to an aspect of the invention, the linear compressor further comprises a power measuring part measuring consumption power of the linear motor, wherein the motor controller adjusts the criterion time within a predetermined adjustment range in a case that the measured consumption power is not identical to a predetermined low power criterion power.

According to another aspect of the invention, a control method of a linear compressor comprising a reciprocating piston, a linear motor driving the piston, and a motor controller controlling the linear motor according to power, the method comprises: providing a near-collision detector to detect a position of the piston and a collision return time calculator calculating a return time according to cycles of the piston; detecting whether the near-collision detector passes a near-collision point spaced from a top dead center according to a predetermined high power with a predetermined high power distance; calculating a near-collision point return time taken for the piston to return to the near-collision point according to compression and expansion cycles with the collision return time calculator; and allowing the motor controller to decrease a driving force of the linear motor in a case that the near-collision point return time is greater than a predetermined allowance time, and to increase the driving force of the linear compressor in a case that the near-collision point return time is less than the allowance time in a control according to high power.

According to an aspect of the invention, the control method of the linear compressor further comprises: providing an entry point detector to detect a position of the piston and a entry return time calculator to calculate a return time according the cycles of the piston; detecting whether the piston passes an entry detection point spaced from the top dead center to low power with a predetermined low power distance using the entry point detector; calculating an entry detection point return time taken for the piston to return to the entry detection point according to the compression and expansion cycles using the entry return time calculator; and allowing the motor controller to decrease the driving force of the linear motor in a case that the entry detection point return time is greater than a predetermined criterion time per power, and to increase the driving force of the linear motor in a case that that the entry detection point return time is less than the criterion time in a control of the low power.

According to an aspect of the invention, the control method of the linear compressor further comprises: providing a power detector detecting consumption power of the linear motor; detecting the consumption power of the linear motor using the power detector; and allowing the motor controller to decrease the criterion time within a predetermined lower range in a case that the consumption power of the linear motor is greater than a predetermined criterion power of low power, and to increase the criterion time within a predetermined upper range in a case that the consumption power of the linear motor is less than the criterion power of the low power using the motor controller.

According to an aspect of the invention, the control method of the linear compressor further comprises allowing the motor controller to stop driving of the motor in a case that the near-collision point return time is greater than a predetermined driving stop duration that is greater than the allowance time, and to resume the linear motor after a predetermined stand-by time.

According to an aspect of the invention, the control method of the linear compressor comprises providing a core to detect a position of the piston, wherein the near-collision detector detects whether the piston passes the near-collision point by detecting the position of the core.

According to an aspect of the invention, the control method of the linear compressor comprises providing a core to detect a position of the piston, wherein the entry point detector detects whether the piston passes the entry detection point by detecting the position of the core.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which:

FIGS. 9A through 10C illustrate an input waveform of a first voltage comparator and an output waveform of a digital signal processor according to a reciprocal movement of the piston of the linear compressor;

DETAILED DESCRIPTION OF THE EMBODIMENTS

Figure 1:
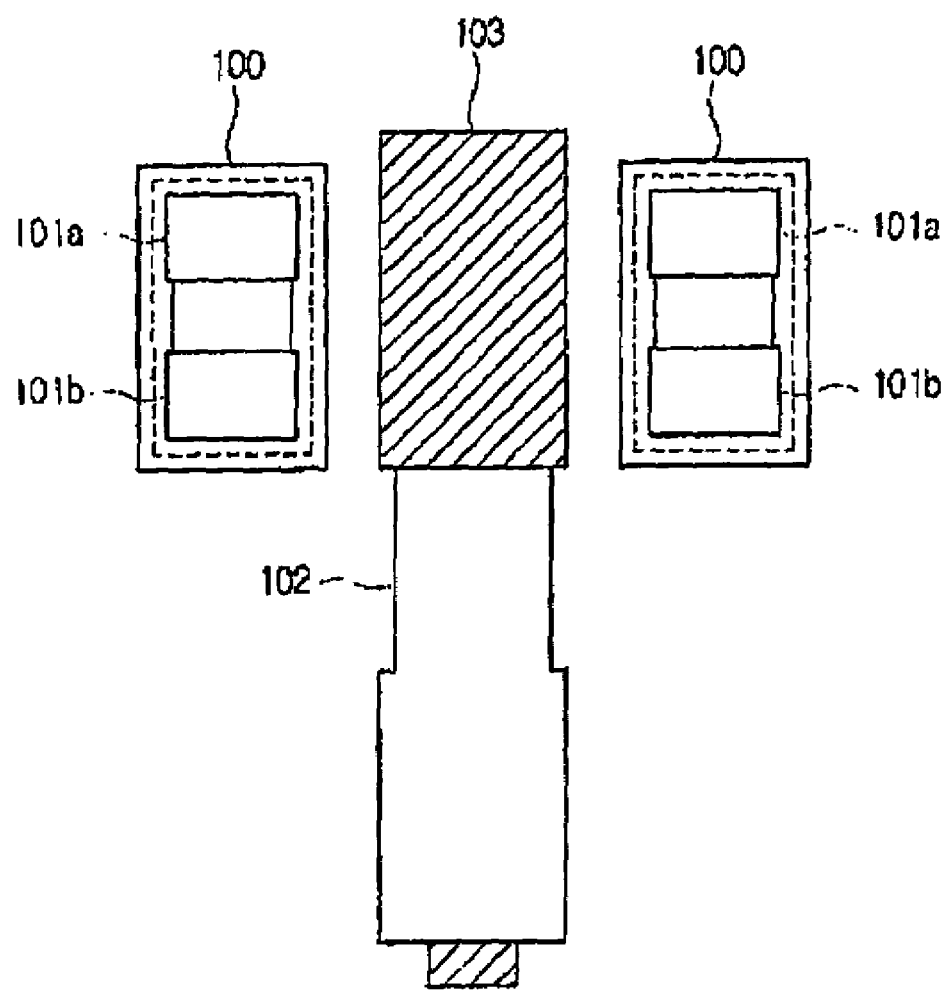
FIG. 1 is a cross-sectional view of a sensor structure for detecting a position of the piston of a conventional linear compressor.
Figure 2:
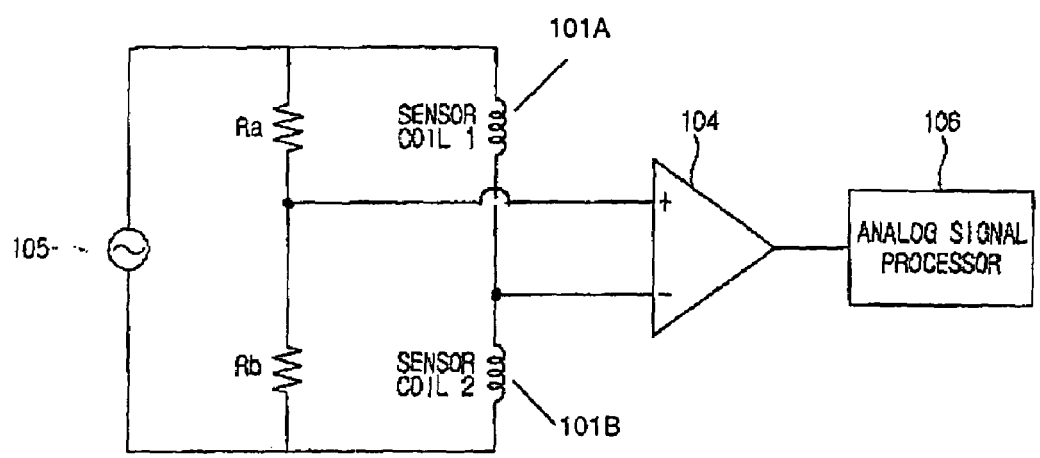
FIG. 2 illustrates a schematic connection configuration of a position detection circuit of the piston of the conventional linear compressor.
Figure 3:
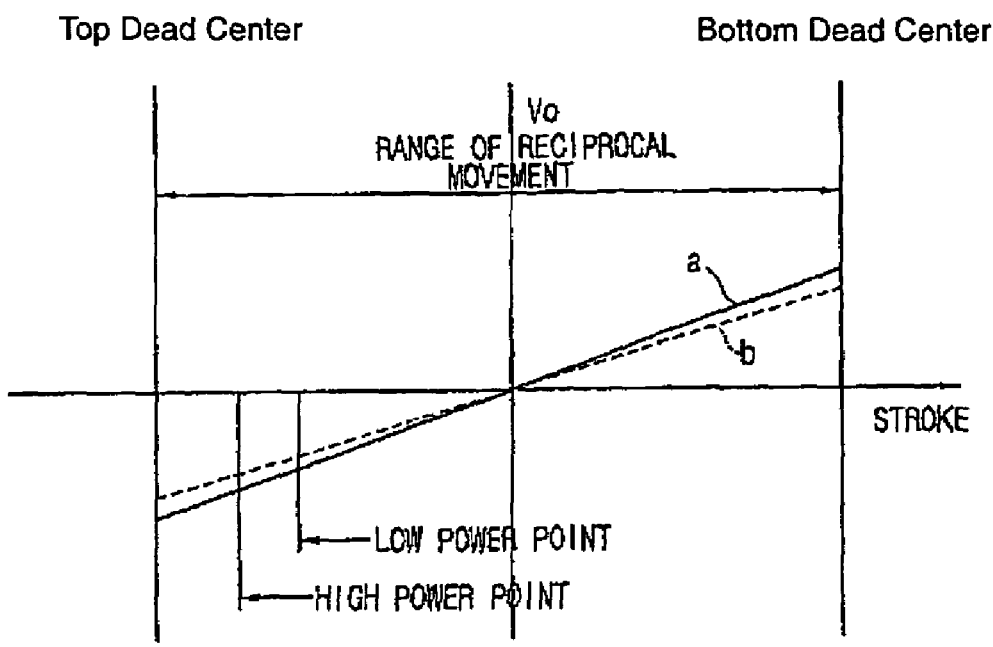
FIG. 3 illustrates an output of the position detection circuit of the piston of the conventional linear compressor.

Reference will now be made in detail to the aspects of the present invention, examples of which are illustrated in the accompanying drawings, wherein like reference numerals refer to like elements throughout. The aspects are described below in order to explain the present invention by referring to the figures.

Figure 4:
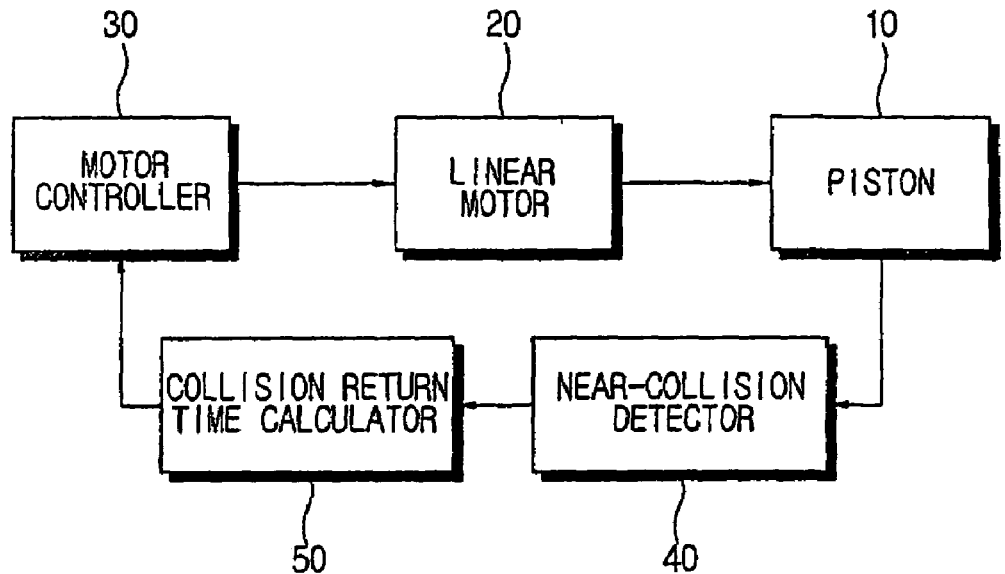
FIG. 4 is a schematic configuration block diagram of a linear compressor according to an aspect of the invention.

FIG. 4 is a schematic configuration block diagram of a linear compressor according to an aspect of the present invention. As shown in FIG. 4, a linear compressor comprises a piston 10, a linear motor 20, a motor controller 30, a near-collision detector 40, and a collision return time calculator 50. The piston 10 is connected to the linear motor 20 and reciprocates according to a compression cycle and an expansion cycle.

The motor controller 30 controls the linear motor 20 so that a stroke of the piston 10 varies according to power, such as a top dead center and a bottom dead center position of the piston. The top dead center during a high power operation is positioned closer to a valve, compared to a lower power operation. While described in terms of top and/or bottom dead center, it is understood that other reference points can be used.

The near-collision detector 40 detects whether the piston 10 passes a predetermined near-collision position. The near-collision position of the shown embodiment is located near the top dead center of the piston at a particular stage of a high power operation that can be diversified into various stages. Accordingly, the near-collision position has a predetermined high power distance from the top dead center of a predetermined high power operation. The near-collision detector 40 may comprise an optical sensor using a laser, an elastic member, electric force, a magnetic force, an induced electromagnetic force to detect the position of the piston 10, a core sensing structure, and other such detectors according to aspects of the invention.

The collision return time calculator 50 measures a return time to the near-collision position taken for the piston 10 to return to a same position from the near-collision position according to compression and expansion cycles. The return time is used to calculate the top dead center position that the piston reaches as the piston 10 passes the near-collision position by overshooting.

The near-collision detector 40 detects whether the piston 10 passes the near-collision position according to cycles of the linear motor 20 and the piston 10. Accordingly, the collision return time calculator 50 calculates the return time to the near-collision position.

The motor controller 30 controls a driving force of the linear motor 20 by comparing the return time to the near-collision position calculated with a predetermined allowance time according to the high power. Herein, the allowance time refers to a time taken for the piston 10 to return to the near-collision position after passing the near-collision position by the overshooting according to the high power. The allowance time is a criterion time set by adjusting a gap between the top dead center of the piston and a valve. Hereinbelow, a process of control will be described.

When the return time to the near-collision position is greater than the allowance time, it is determined that the stroke of the piston 10 and the driving force of the linear motor 20 are greater than a targeted amount, and the driving force of the linear motor 20 is decreased. Accordingly, the top dead center and the valve can be kept apart with the gap, preventing a possibility of a collision in advance. Meanwhile, when the return time to the near-collision position is smaller than the allowance time, the driving force of the linear motor 20 is increased, enabling the stroke of the piston 10 to reach the targeted amount. Accordingly, the possibility of a collision of the piston 10 and the valve can be minimized. The motor controller 30 can be used as a triac and a driving controller to control the motor operated by alternative current (AC). However, other controllers can be used.

When the return time to the near-collision position is greater than a predetermined driving stop duration, which is greater than the allowance time according to the high power, the motor controller 30 stops and resumes the driving of the linear motor 20. Herein, with the predetermined driving stop duration, the top dead center of the piston is located at a position where the collision between the piston and the valve could occur. As described above, by positioning the near-collision position (that becomes a basis of calculation of the return time to the near-collision position) near to the top dead center of the piston during the high power, a possibility of a collision between the piston 10 and the valve is minimized.

A low power may refer to the low power according to a specification of a product. However, the low power most always refers to stages of power wherein the stroke is small enough not to thrust the piston 10 past the near-collision position. Herein, to control reciprocal movement of the piston 10 according to the low power, a low power controller is added to detect the movement of the piston 10 according to the low power operation and to measure the magnitude of the stroke.

Figure 5:
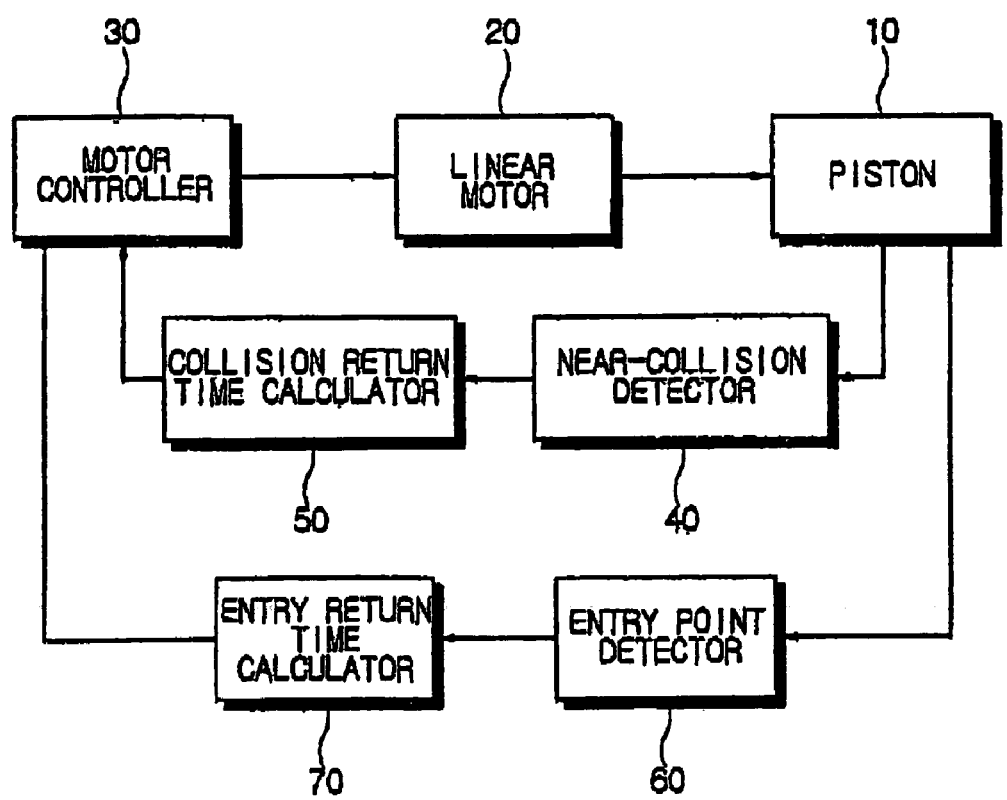
FIG. 5 is a schematic block diagram of a linear compressor according to an aspect of the invention.

FIG. 5 is a schematic block diagram of the linear compressor according to an aspect of the invention. The linear compressor shown in FIG. 5 further includes an entry position detector 60 and an entry return time calculator 70 as a control device of the low power.

The entry position detector 60 detects whether the piston 10 passes by on a basis of a predetermined entry position detection position located near the top dead center of the piston 10 during the low power operation. The entry position detection position may be selected on a basis of the top dead center by selecting a particular stage of the low power among various stages of the low power.

The entry return time calculator 70 measures entry detection position return time taken for the piston 10 to pass the entry detection position according to the compression cycle by overshooting to return.

The motor controller 30 controls the linear motor 20 by comparing a criterion time according to the low power and the entry detection position return time. In other words, if the entry detection position return time is smaller than the criterion time, the driving force of the motor is increased. If the entry detection position return time is greater than the criterion time, the driving force of the motor is decreased so that the entry detection position return time and the criterion time become identical.

The linear compressor described in FIGS. 4 and 5 may comprise a core 80 detecting the position of the piston 10.

Figure 6:
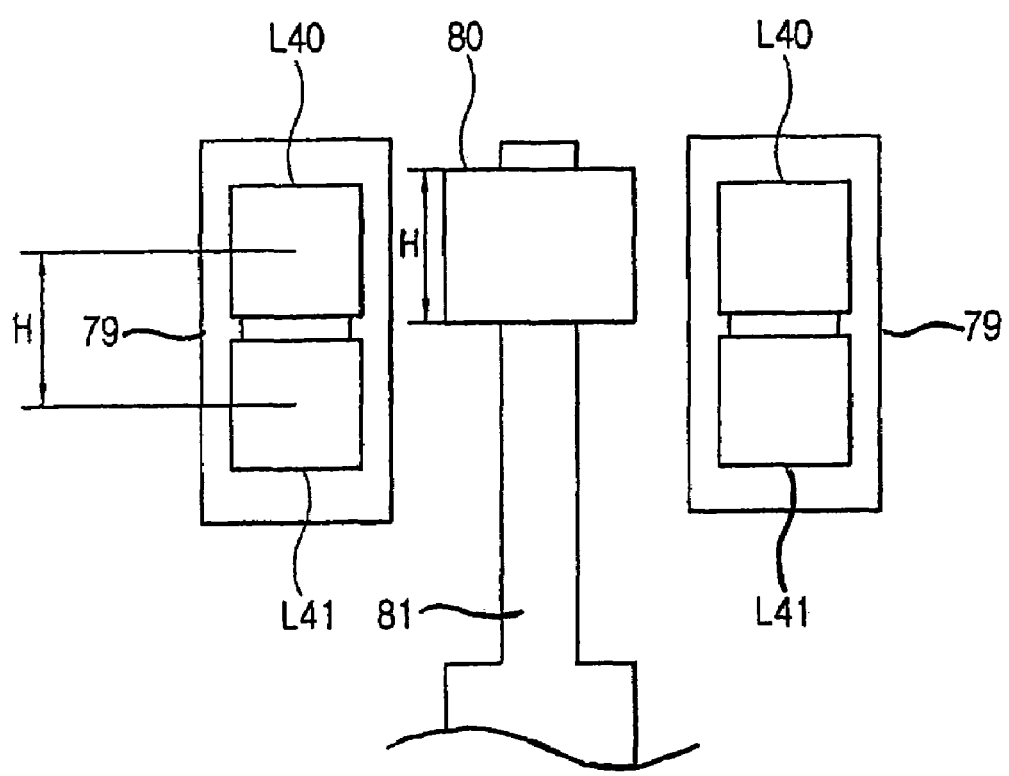
FIG. 6 is a cross sectional view of a sensor structure for detecting a position of the piston of the linear compressor of FIGS. 4 and 5.

FIG. 6 is a cross sectional view of a sensor structure for detecting the position of the piston 10 of the linear compressor according to an aspect of the present invention. As shown in FIG. 6, the linear compressor comprises a sensor main body 79, a core 80, and sensor coils L40 and L41. The sensor main body 79 is cylindrical with a space inside to allow for a reciprocal movement of the core 80. The core 80 is connected to the piston 10 by a core support 81 and is used to detect the position of the piston 10. The core 80 may be manufactured by a method of forcing a magnetic material into the non-magnetic core support 81, or a method of insert molding plastic material. However, it is understood that other shapes and manufacturing methods can be used.

The sensor coils L40 and L41 are divided into an upper sensor coil L40 surrounding a space where the core 80 moves in, and a lower sensor coil L41. The upper sensor coil L40 and the lower sensor coil L41 are induced with the inductance as the core 80 moves in an inside of the sensor main body 79.

As the piston 10 passes the near-collision position, positions of the core 80 and the sensor coil are adjusted so that a middle position (hereinafter referred to as a core origin) of length that is parallel to the reciprocal movement of the core 80 passes a middle position (hereinafter referred to as a coil origin) between the upper sensor coil L40 and the lower sensor coil L41.

Figure 7:
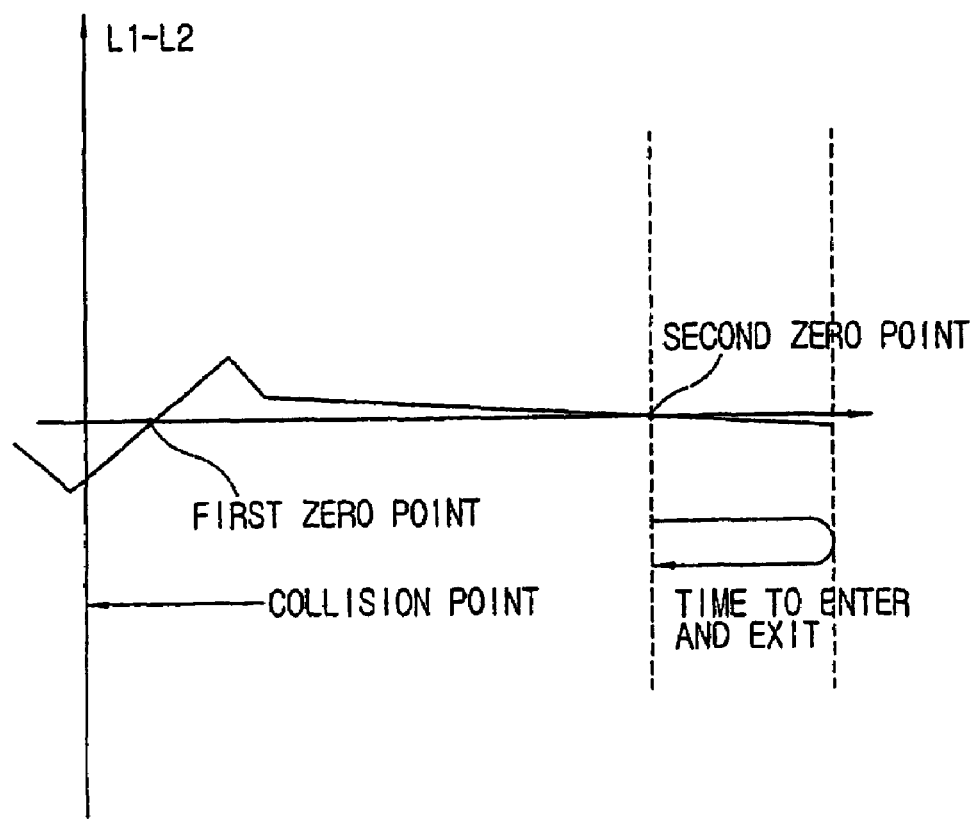
FIG. 7 illustrates a graph showing a difference of induced inductances of sensor coils.

FIG. 7 illustrates a graph showing a difference of the induced inductances of the sensor coils if the induced inductances of the upper sensor coil L40 and the lower sensor coil L41 are L1, and L2, respectively.

When the core origin passes the coil origin, the difference of the induced inductances passes a first zero point. The inductances induced in the upper sensor coil L40 and the lower sensor coil L41 are identical. A second zero point appears when the core 80 does not affect the upper sensor coil L40. The return time from the second zero point according to a continuous expansion and compression is identical to a time taking for the core 80 to enter and exit the inside of the sensor main body 79.

If the core origin is inclined toward the lower sensor coil L41 by the compression, the gap between the piston 10 and the valve will be reduced. Herein, the difference of the induced inductances passes a collision point.

A length being parallel to the reciprocal movement of the core 80 affects an accuracy of the difference of the induced inductances in the graph. The core 80 is preferably shorter than a lengthwise length (hereinafter referred to as a lengthwise length of a sensor coil L40, L41) that extends from a first side of the upper sensor coil L40 to a first side of the lower sensor coil L41. Accordingly, the size of the linear compressor may be decreased. As shown in FIG. 7, the core 80 length may be half a length of the lengthwise length of the sensor coil L40, L41 so that the difference of the induced inductance does not have a large variation in the inclination as it passes the first zero point, and a value at a highest point of the graph does not decrease. Using the difference of the induced inductances according to the movement of the core 80 of a size described above, it can be more accurately detected whether the piston 10 passes the near-collision position.

Figure 8:
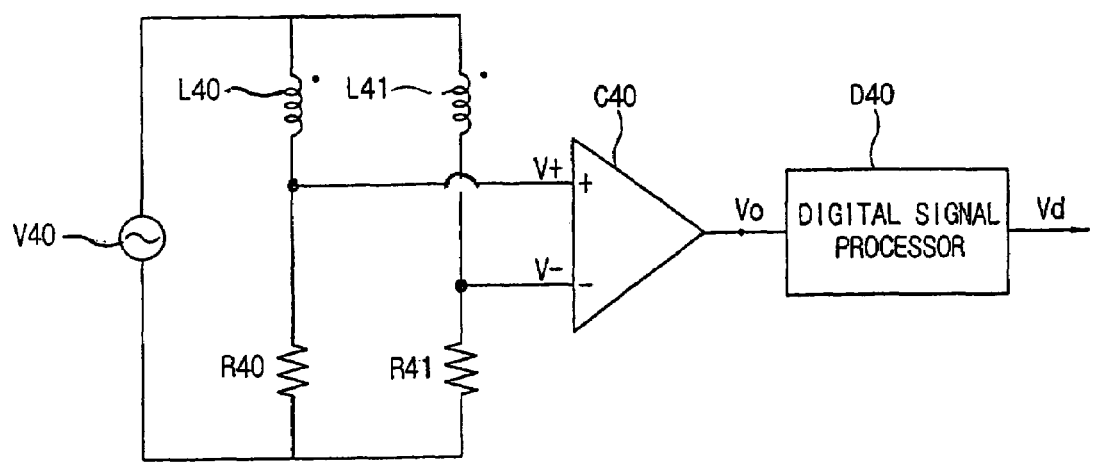
FIG. 8 is a schematic circuit configuration of the near-collision detector.
Figure 9:
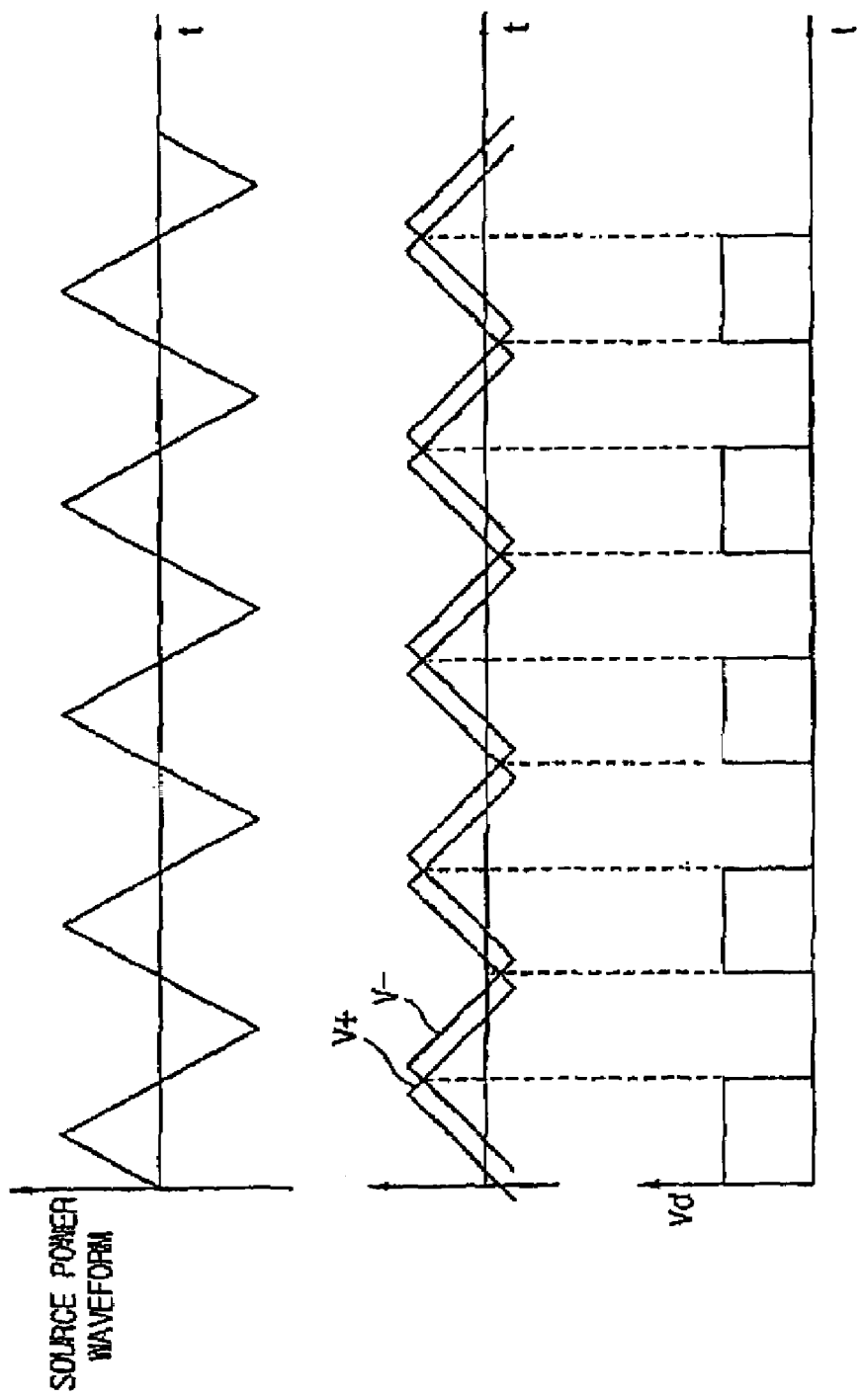
Figure 10:
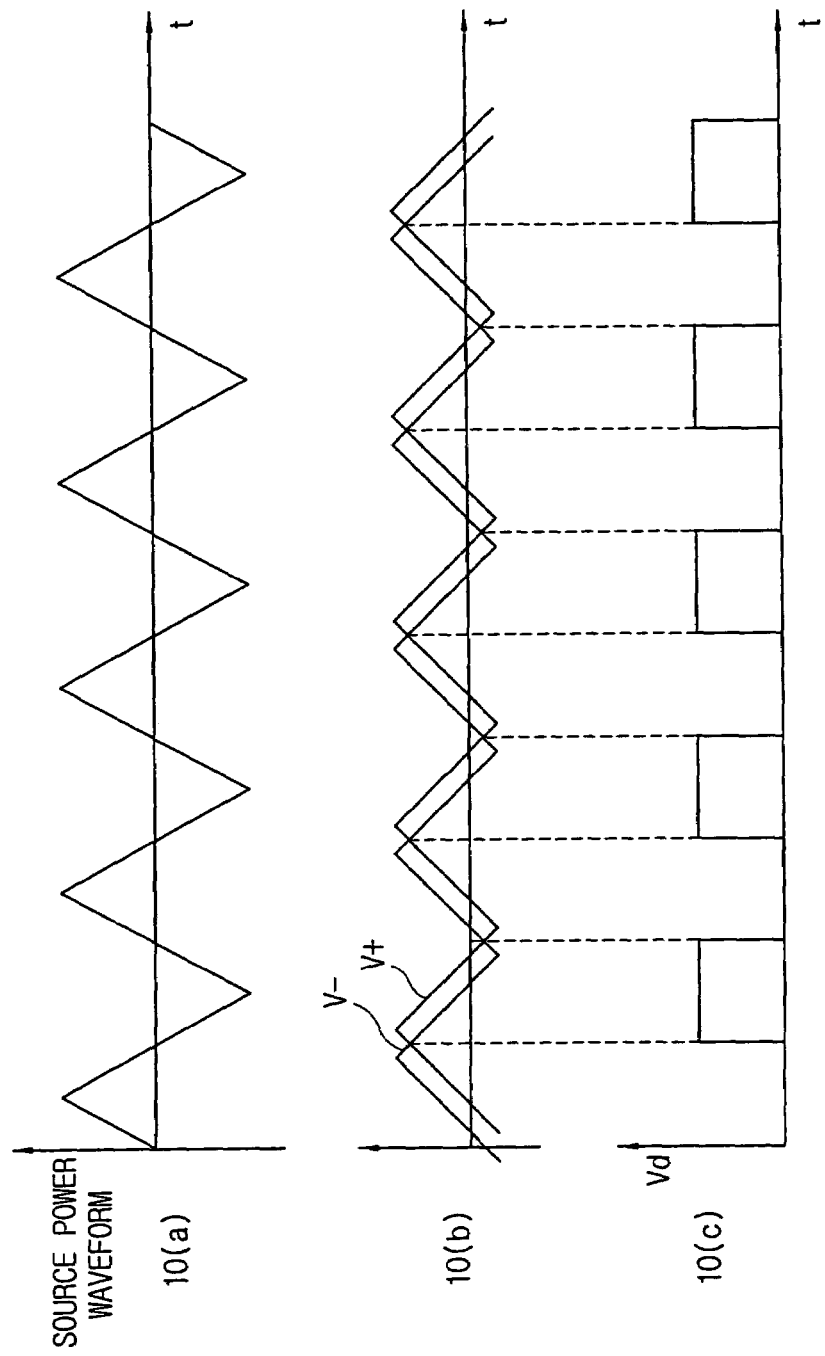

FIG. 8 is a schematic circuit configuration of the near-collision detector 40. As shown in FIG. 8, the near-collision detector 40 comprises distributing resistors R40 and R41, a source power V40, a first voltage comparator C40, and a digital signal processor D40.

An upper distributing resistor R40 and a lower distributing resistor R41 are connected to first sides of the upper sensor coil L40 and the lower sensor coil L41, respectively, with a same value of resistance.

The source power V40 is shown to be a power having a periodic wave form applied to respective second sides of the upper sensor coil L40 and the lower sensor coil L41 to measure the inductances of the upper sensor coil L40 and the lower sensor coil L41. However, it is understood that other types of power can be supplied.

The first voltage comparator C40 is inputted with respective voltage applied to the upper distributing resistor R40 and the lower distributing resistor R41 as comparing voltages V+ and V−, and outputs an amplified voltage. Herein, the first voltage comparator C40 may also be inputted with voltages applied to the upper sensor coil L40 and the lower sensor coil L41 according to an aspect of the invention.

The digital signal processor D40 outputs a rectangular wave Vd according to the output of the first voltage comparator C40 to the collision return time calculator 50.

FIGS. 9A through 10C illustrate an input waveform of the first voltage comparator C40 and an output waveform of the digital signal processor D40 according to the reciprocal movement of the piston 10 of the linear compressor.

FIGS. 9A through 9C illustrate waveforms when the core origin is inclined to the lower sensor coil L41 from the coil origin.

FIG. 9A illustrates a triangle waveform for the source power V40, FIG. 9B illustrates waveforms inputted into a positive terminal and a negative terminal of the first voltage comparator C40. Herein, the inductance L2 of the lower sensor coil L41 has a greater value than the inductance L1 of the upper sensor coil L40. The waveform inputted into the negative terminal of the first voltage comparator C40 has a greater time delay that the waveform inputted into the positive terminal.

As shown in FIG. 9C, the digital signal processor D40 generates the rectangular wave Vd having a high level when the voltage V+ of the positive terminal of the first voltage comparator C40 is greater than the voltage V− of the negative terminal.

FIGS. 10A through 10C illustrate waveforms in a case that the core origin is inclined toward the upper sensor coil L40 from the coil origin. In this case, the inductance L1 of the upper sensor coil L40 has a greater value than the inductance L2 of the lower sensor coil L41, and the waveform V+ inputted into the positive terminal of the first voltage comparator C40 has a greater time delay. FIG. 10B illustrates an input waveform of the first voltage comparator C40, and FIG. 10C illustrates the rectangular wave Vd outputted from the digital signal processor D40 corresponding to FIG. 10B.

The output of the first voltage comparator C40 becomes 0 in a case that the input voltages are same, or inductances induced in the respective sensor coils L40 and L41 are same. With such outputs, the near-collision detector 40 detects that the piston 10 passes the near-collision position.

Figure 11:
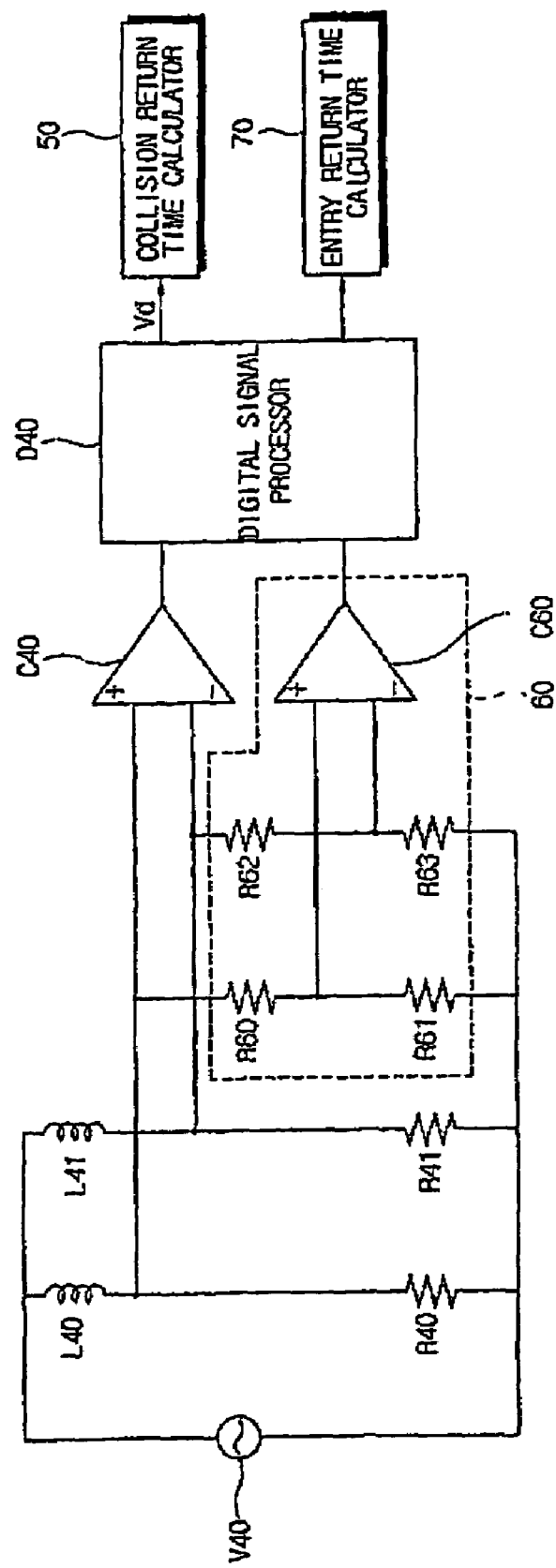
FIG. 11 is a schematic configuration block diagram of a linear compressor added with an entry position detector of FIG. 5.

Herein, the entry position detector 60 can be realized by distorting the input signal of the first voltage comparator C40. As shown in FIG. 11, the entry position detector 60 comprises distributing resistors R60 through R63, and a second voltage comparator C60.

A first distributing resistor R60 and a second distributing resistor R61 are connected in serial to each other and are connected to an upper distributing resistor R40 in parallel. A third distributing resistor R62 and a fourth distributing resistor R63 are connected in serial to each other and are connected to a lower distributing resistor R41 in parallel.

The second voltage comparator C60 amplifies the input voltages in the same manner the first voltage comparator C40, and outputs the amplified voltage to the digital signal processor D40. However, an input terminal voltage of the second voltage comparator C60 is the voltages applied to the second distributing resistor R61 and the fourth distributing resistor R63, respectively. The input terminal voltage is different in level and waveform of the voltage, when it is compared to that of the first voltage comparator C40. The output of the second voltage comparator C60 has a smaller magnitude than the output of the first voltage comparator C40 because the output of the second voltage comparator C60 is inputted with a distributed voltage of the input voltage of the first voltage comparator C40. In addition, the output of the second voltage comparator C60 may have a varied waveform. A composite resistance of the mutually connected distributing resistors in serial may be configured to be high so that an operation property of the first voltage comparator C40 is not be affected.

With reference to the movement of the piston 10, the distributing resistors R60 through R63 may be adjusted so that the position of the piston 10 at a moment that the output of the second voltage comparator C60 becomes 0 is the entry detection position. Accordingly, the magnitude of the stroke according to the low power can be controlled using a time that the piston 10 overshoots from the entry detection position during the low power operation.

The piston 10 passes the entry detection position as the second voltage comparator C60 outputs 0 according to the continuous compression and expansion cycles. Accordingly, the output of the digital signal processor D40 is similar to that shown in FIG. 9C or FIG. 10C.

Figure 12:
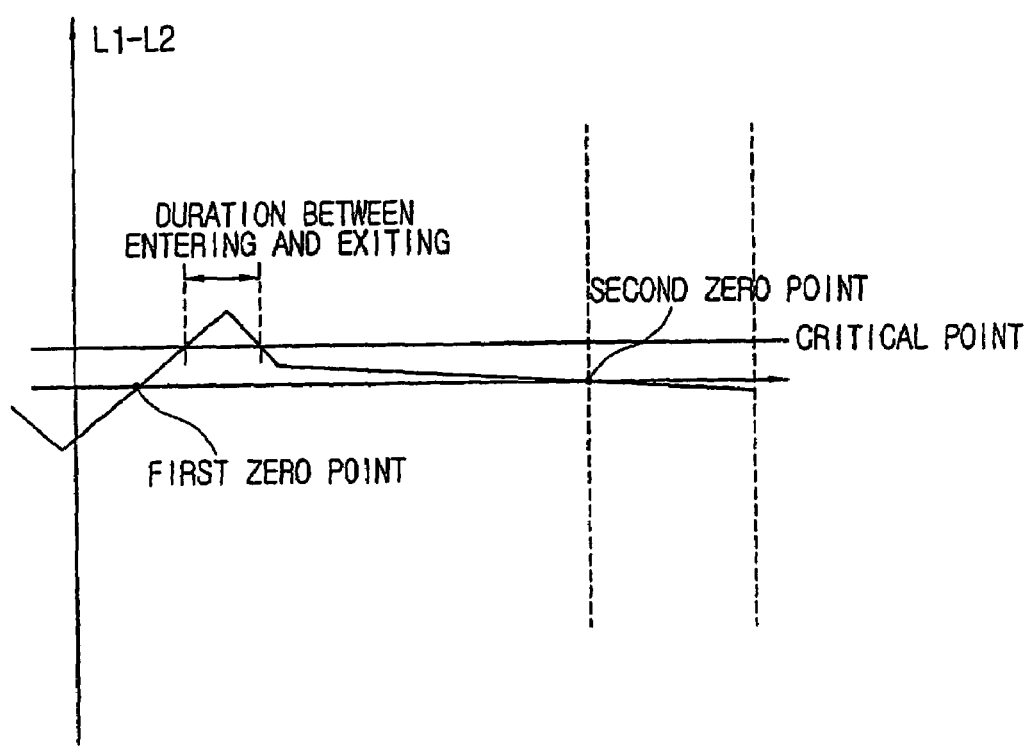
FIG. 12 is a graph illustrating a waveform of the difference of the inductances in FIG. 7 and a critical position on which the piston passes the entry detection position.

FIG. 12 is a graph illustrating a waveform of the difference of the inductances in FIG. 7 and a critical position on which the piston 10 passes the entry detection position. Although the inductances induced in the sensor coils L40 and L41 are not identical when the piston 10 passes the entry detection position through the critical position, it can be detected whether the piston 10 passes the entry detection position by setting the output of the second voltage comparator C60 to be 0 with a signal distortion. However, there is one more position where the output of the second voltage comparator C60 becomes 0 other than the entry detection position. This position is indicated in FIG. 12 with an entry section, and a speed of the piston can be measured on a basis of the entry section.

However, as the distributing resistors R60 through R63 are sensitive to an external influence such as heat noise, it may be difficult to accurately measure the position of the piston 10 of the low power. An error in detecting the position of the piston is described with reference to FIG. 13.

Figure 13:
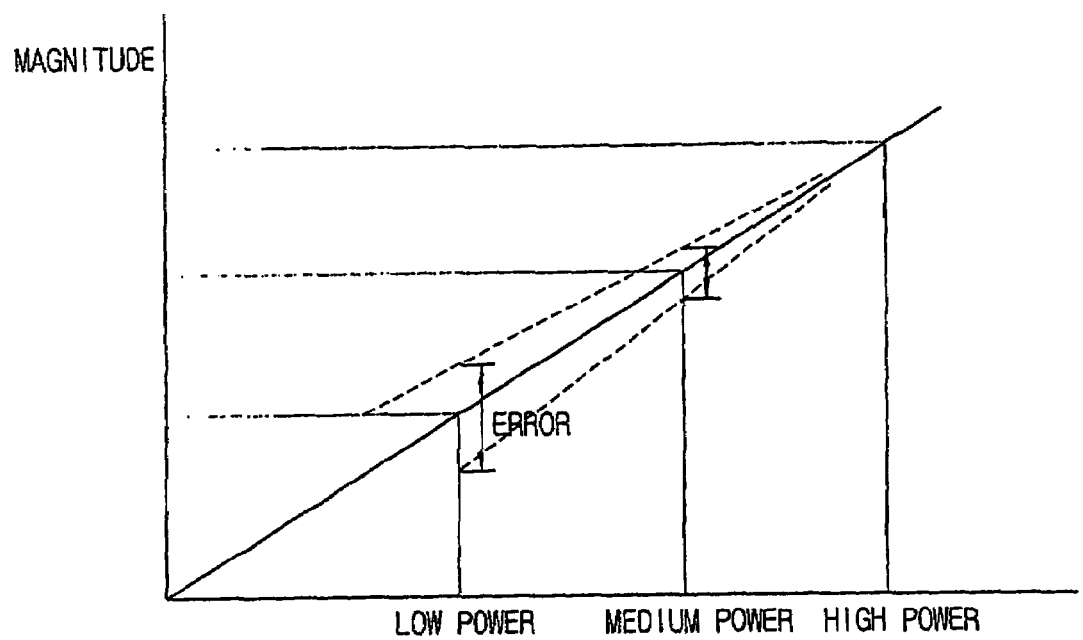
FIG. 13 illustrates a variation of actual power in a case that a stroke of the piston is controlled near a top dead center according to a high power such as at the near-collision position.

FIG. 13 illustrates a variation of power or a magnitude of a position detection error of the piston 10 when the stroke of the piston 10 is controlled near the top dead center according to the high power such as at the near-collision position. The error is larger with respect to the low power as compared to the high power and medium power. To compensate the error, consumption power of the linear motor 20 may be measured and controlled.

Figure 14:
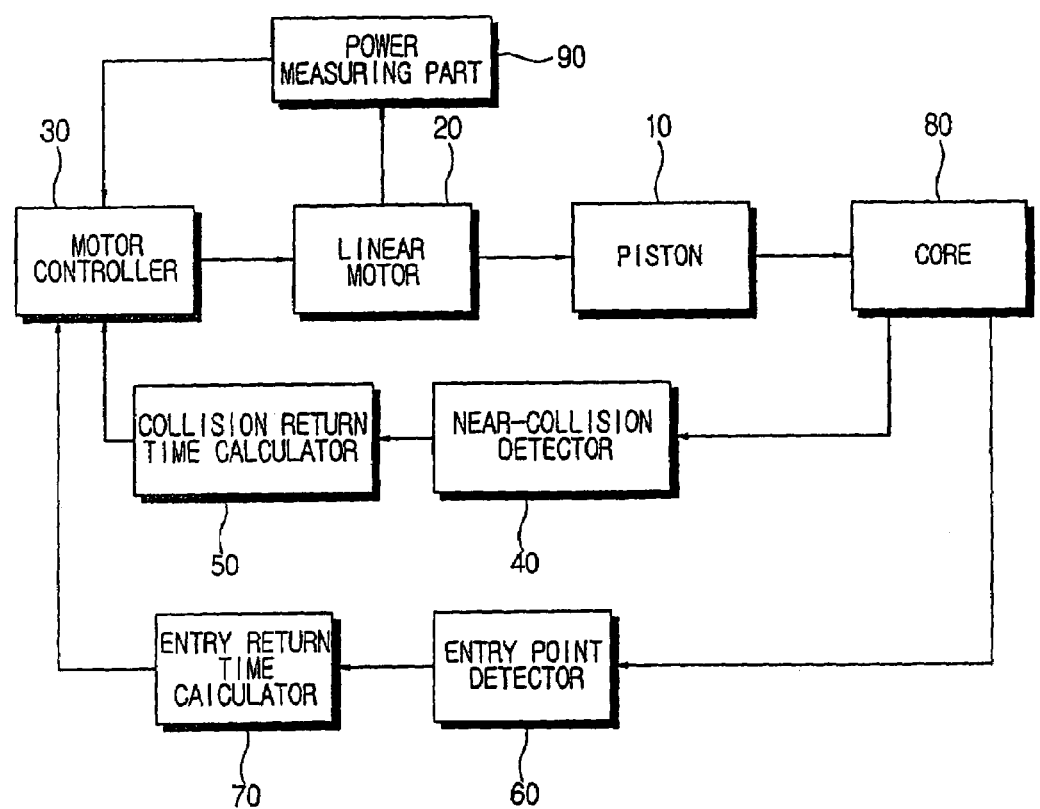
FIG. 14 is a schematic block diagram of a linear compressor according to an aspect of the invention.

FIG. 14 is a schematic block diagram of a linear compressor according to an aspect of the invention. The linear compressor shown in FIG. 14 is the linear compressor in FIG. 5 with the addition of a power measuring part 90. As such, a description of those elements described in relation to the linear compressor of FIG. 5 will not be again described.

The power measuring part 90 measures the consumption power of the linear compressor 20 and outputs a measured value to the motor controller 30. For example, the power measuring part 90 measures a magnitude and a phase difference of voltage and current supplied to a motor through the triac in order to compute the consumption power. Herein, the motor controller 30 controls a gate terminal of the triac with a predetermined criterion power per each power and a predetermined adjustment range of a criterion time of the linear motor 20, as shown in FIG. 15.

Figure 15:
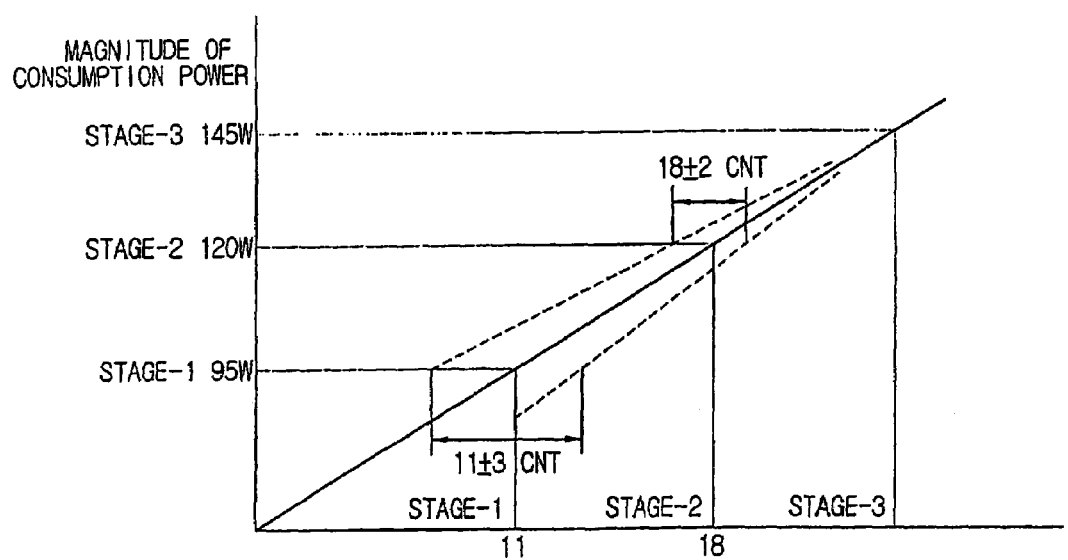
FIG. 15 illustrates a criterion power per power and an adjustment range for the linear compressor of FIG. 14.

As shown in a criterion graph in FIG. 15, an operation stage-1 requires the criterion power of 95 W, the criterion time of 11 cnt, and the adjustment range of 3 cnt. Herein, a unit of cnt is a unit for sampling in a microcomputer. However, during the operation stage 1, measured consumption power and the return time of the entry detection position may differ. For example, if the consumption power of the measured motor is 93 W and the return time of the entry detection position is 8 cnt, the motor controller 30 adjusts the criterion time to 14 cnt as the consumption power is less than the criterion power. Also, because the return time of the entry detection position is less than the criterion time, the driving force of the linear motor 20 is increased.

Figure 16:
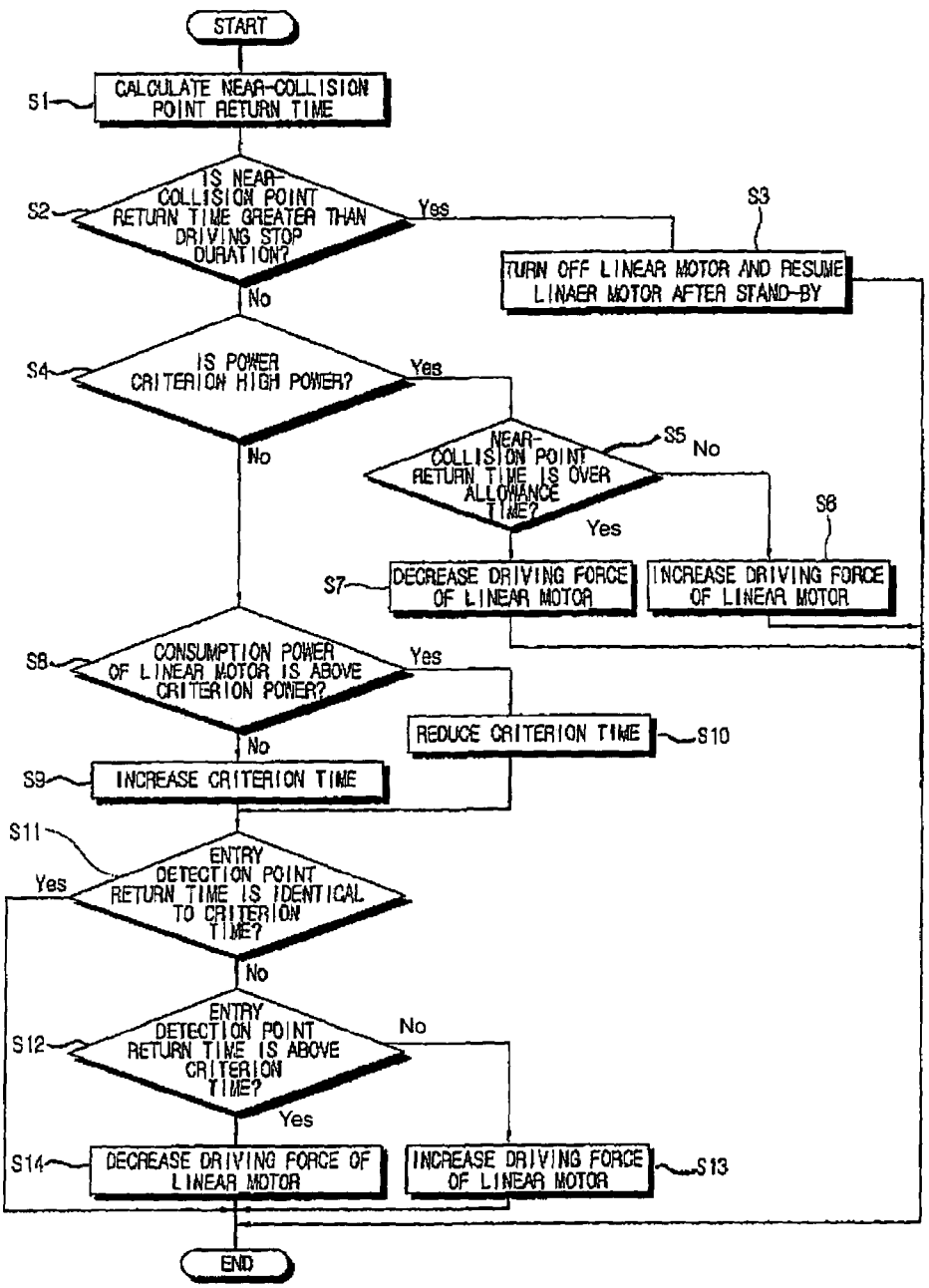
FIG. 16 is a flow chart describing an operation of the linear compressor in FIG. 14.

FIG. 16 is a flow chart that describes an operation of the linear compressor in FIG. 14. While not required, it is understood that the method of FIG. 14 can be implemented, in whole or in part, using computer software encoded on a computer readable medium for use by a general or special purpose computer.

The return time of the near-collision position is calculated on a basis of a detection result from the near-collision detector 40 at operation S1. The collision return time may be calculated using a collision return time calculator 50.

The return time to the near-collision position is compared with a predetermined driving stop duration at operation S2. If the return time is greater than the driving stop duration, the linear motor 20 is turned off and the motor is resumed after a predetermined stand-by time at operation S3.

If the return time of the near-collision position is less than the driving stop duration, it is determined whether the controlled power is a predetermined criterion high power at operation S4. Herein, the criterion high power is a minimum high power with the magnitude of the stroke that passes the near-collision position.

When the high power is distinguished into various stages, the motor controller 30 compares the return time of the measured near-collision position with the allowance time per each stage at operation S5. Herein, if the measured return time is less than the allowance time, the driving force of the linear motor 20 is increased at operation S6. If the measured return time is greater than the allowance time, the driving force of the linear motor 20 is decreased at operation S7.

When the power is the low power, the power measuring part 90 measures the consumption power of the linear motor 20. At operation S8, the measured consumption power is compared with the criterion power. If the measured consumption power is less than the criterion power, the criterion time is increased at operation S9. If the measured consumption power is greater than the criterion power, the criterion time is decreased at operation S10.

The measured return time of the entry detection position and the criterion time are compared at operations S11 and S12. If they are identical, the driving force of the motor is kept constant. If the return time is less than the criterion time, the driving force-of the motor is increased at operation S13. If the return time is greater than the criterion time, the driving force of the motor is decreased at operation S14.

Figure 17A:
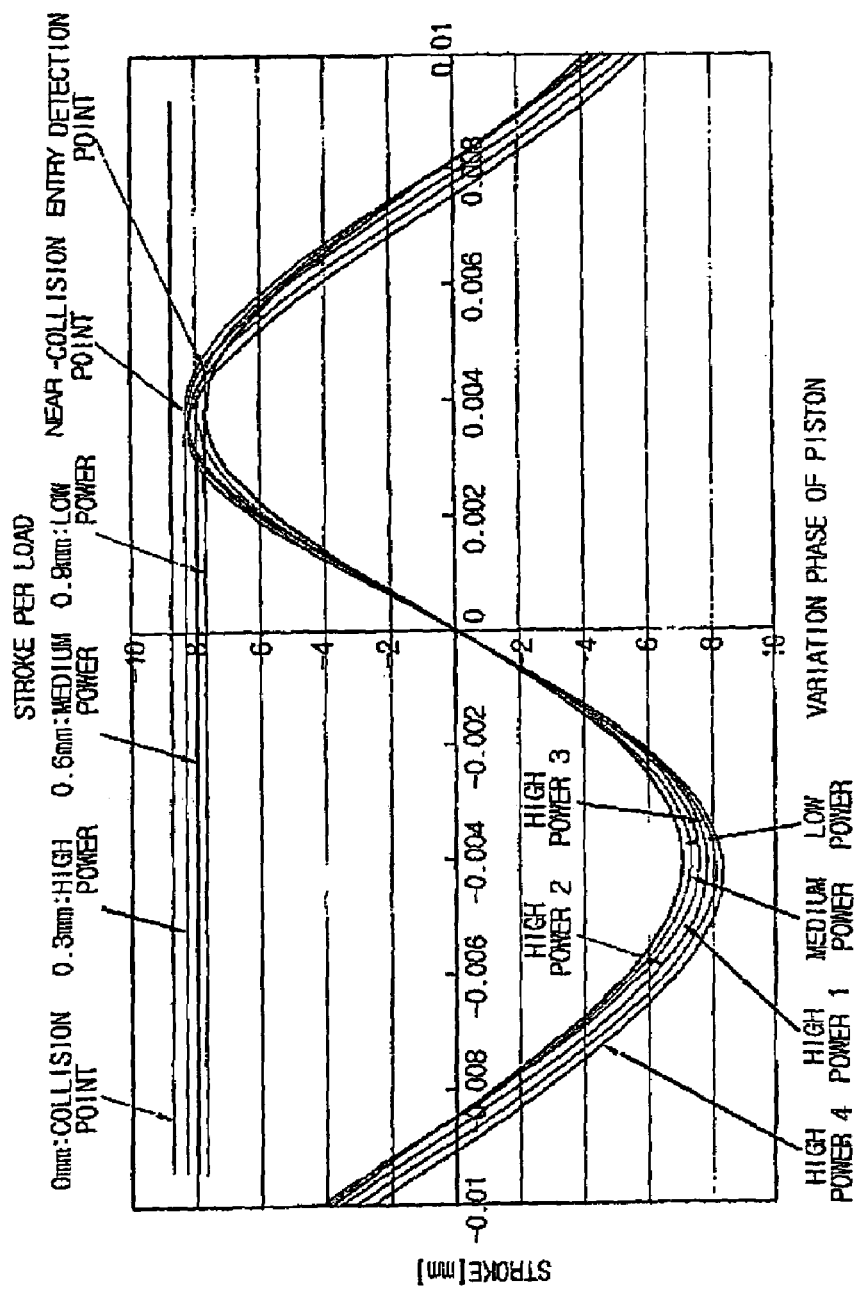
FIG. 17A illustrates a variation of a piston per load according to the aspect shown in FIG. 14.
Figure 17B:
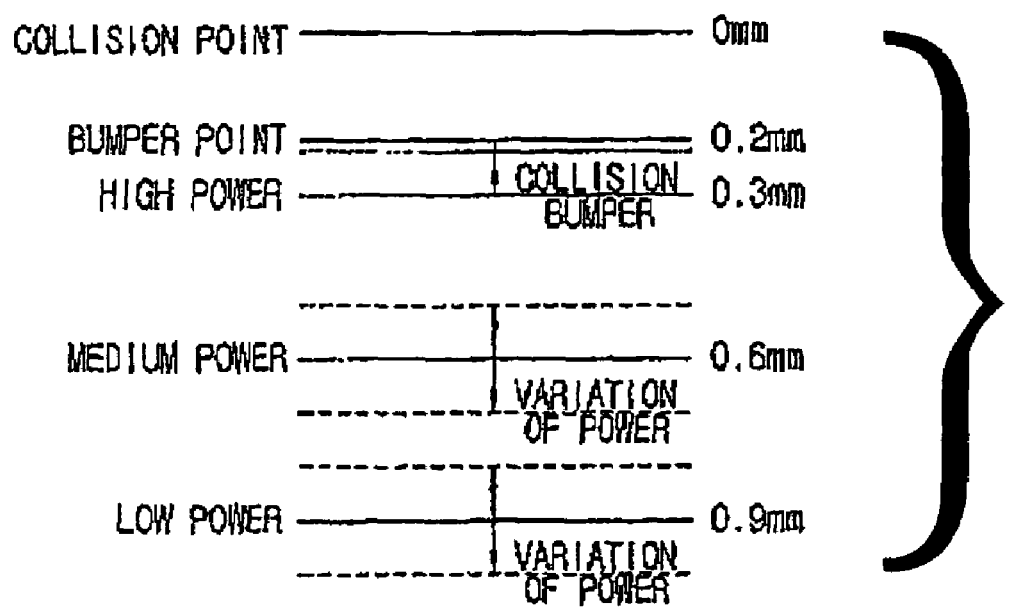
FIG. 17B illustrates a position of the top dead center according to the power of the aspect shown in FIG. 14.

FIGS. 17A through 17B illustrate a variation of the piston according to the aspect of the invention shown in FIG. 14.

FIG. 17A illustrates that the variation of the piston 10 according to time is a sinusoidal waveform.

FIG. 17B illustrates a position of the top dead center according to the power. The variation of the power is small, such that the variation of power seems to be almost constant as it is represented with each stage of the power. The variation of the power is a difference of a targeted magnitude of the stroke of the piston 10 and the actual top dead center of the piston 10.

The movement of the piston 10 depicts a sinusoidal waveform. As the actual movement of the piston 10 differs from the sinusoidal waveform, the collision problem between the piston 10 and the valve occurs. To control the magnitude of stroke of the piston 10 during the high or low power operation, each position detection position should be set and overshooting times corresponding to the detection positions should be calculated.

The criterion position of the piston 10 during the high power operation is the near-collision position which is close to a specific top dead center of the high power. The collision between the piston and the valve can be minimized by detecting and using the return time of the near-collision position.

If the magnitude of the stroke is not large enough to reach the near-collision position, the return time of the piston 10 is measured on a basis of the entry detection position. An accurate control of the low power is obtained by compensating the error of the targeted stroke and the measured stroke while considering the consumption power of the linear compressor.

FIGS. 17A through 17B show a situation where the near-collision position is located approximately 0.3 mm from the valve. The high power operation can be measured up to operation stage 4, in order to minimize the collision between the piston 10 and the valve. Herein, the near-collision position can be adjusted to the top dead centers of the operation stages 1 through 3.

A bumper position in FIG. 17B is a criterion point of the top dead center of the piston corresponding to the driving stop duration, which is approximately 0.2 mm apart from the valve. The entry detection position is adjusted to the top dead center of the piston 10 during the low power operation. Herein, the low power can be distinguished into various stages other than the stages indicated in the drawing. As shown in FIG. 17B, it is noted that the variation of the high power is approximately 0.01 mm while the variation of the low and medium power is approximately 0.1 mm. Herein, the medium power is a stage between the low power and the high power.

According to another aspect of the invention, a linear compressor capable of controlling the reciprocal movement of the piston accurately and having a small size is provided. Moreover, while described as being used in appliances such as refrigerators, it is understood that the linear compressor is usable in other applications involving compression.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A collision prevention unit for use in a linear compressor including a reciprocating piston, a linear motor driving the piston, and a motor controller controlling the linear motor to vary magnitude of a stroke of the piston according to power, the unit comprising:

a near-collision detector detecting whether the piston passes a near-collision position spaced from a top dead center according to a predetermined high power with a predetermined high power distance;

a collision return time calculator calculating a near-collision position return time for the piston to return to the near-collision position based on the detection of the near-collision detector according to compression and expansion cycles;

an entry position detector detecting whether the piston passes an entry position detection position spaced from the top dead center according to a predetermined low power with a predetermined low power distance; and an entry return time calculator calculating an entry detection position return time for the piston to return to the entry detection position according to the compression and expansion cycles based on the detection of the entry position detector, wherein the motor controller decreases a driving force of the linear motor when the near-collision position return time is greater than a predetermined allowance time per power, and increases the driving force of the linear motor when the near-collision position return time is less than the predetermined allowance time per power when controlling according to the high power, and the motor controller further decreases the driving force of the linear motor when the entry detection position return time is greater than a predetermined criterion time per power, and increases the driving force of the linear motor when the entry detection position return time is less than the criterion time.

2. The unit of claim 1, further comprising a core to detect a position of the piston, wherein the near-collision detector detects whether the piston passes the near-collision position by detecting a position of the core.

3. The unit of claim 2, wherein the near-collision detector comprises:

an upper sensor coil and a lower sensor coil having corresponding variable inductances according to a reciprocal movement of the core and spaced apart from each other by a predetermined distance; and a position detector detecting the position of the core by measuring the inductances.

4. The unit of claim 3, wherein the core is positioned in approximately a middle position of the predetermined distance between the upper sensor coil and the lower sensor coil when the piston passes the near-collision position.

5. The unit of claim 3, wherein a length of a movement of the core is a predetermined length that is shorter than a length being parallel to a movement direction of the core and which extends from a first side of the upper sensor coil to a first side of the lower sensor coil.

6. The unit of claim 3, wherein the length of the movement of the core is one half of a length being parallel to the movement direction of the core and extends from a first side of the upper sensor coil to a first side of the lower sensor coil.

7. The unit of claim 3, wherein the position detector comprises:

an upper resistor connected to a first side of the upper sensor coil;

a lower resistor connected to a first side of the lower sensor coil;

a source power applying a predetermined power to a second side of the upper sensor coil and a second side of the lower sensor coil; and a voltage comparator inputted with respective voltages applied to the upper resistor and to the lower resistor to provide an output, wherein the collision return time calculator calculates the near-collision position return time on a basis of the output of the voltage comparator.

8. The unit of claim 1, further comprising a core to detect a position of the piston, wherein the near-collision detector detects whether the piston passes the near-collision position by detecting a position of the core.

9. The unit of claim 8, wherein the near-collision detector comprises:

an upper sensor coil and a lower sensor coil induced with corresponding variable inductances according to a reciprocal movement of the core and spaced apart from each other by a predetermined distance; and a position detector detecting the position of the core by measuring the inductances.

10. The unit of claim 9, wherein the core is positioned in approximately a middle position of the predetermined distance between the upper sensor coil and the lower sensor coil when the piston passes the near-collision position.

11. The unit of claim 9, wherein a length of a movement of the core is a predetermined length that is shorter than a length being parallel to a movement direction of the core and extends from a first side of the upper sensor coil to a first side of the lower sensor coil.

12. The unit of claim 9, wherein the length of the movement of the core is one half of the length being parallel to the movement direction of the core and extends from a first side of the upper sensor coil to a first side of the lower sensor coil.

13. The unit of claim 9, wherein the position detector comprises:

an upper resistor connected to a first side of the upper sensor coil;

a lower resistor connected to a first side of the lower sensor coil;

a source power applying a predetermined power to a second side of the upper sensor coil and a second side of the lower sensor coil; and a voltage comparator inputted with respective voltages applied to the upper resistor and to the lower resistor to provide an output, wherein the collision return time calculator calculates the near-collision position return time on a basis of the output of the voltage comparator.

14. The unit of claim 1, further comprising a core to detect a position of the piston, wherein the entry position detector detects whether the piston passes the entry detection position by detecting the position of the core.

15. The unit of claim 1, further comprising a power measuring part measuring consumption power of the linear motor, wherein the motor controller adjusts a criterion time within a predetermined adjustment range in a case that the measured consumption power is not identical to a predetermined low power criterion power.

16. A control method of a linear compressor having a reciprocating piston, a linear motor driving the piston, and a motor controller controlling the linear motor according to power, the method comprising:

detecting a position of the piston and calculating a return time according to cycles of the piston;

detecting whether a near-collision detector passes a near-collision position spaced from a top dead center according to a predetermined high power with a predetermined high power distance;

calculating near-collision position return time taking for the piston to return to the near-collision position according to compression and expansion cycles;

decreasing a driving force of the linear motor when the near-collision position return time is greater than a predetermined allowance time, and increasing the driving force of the linear compressor when the near-collision position return time is less than the predetermined allowance time in a control according to high power;

detecting a position of the piston and calculating a return time according the cycles of the piston;

detecting whether the piston passes an entry detection position spaced from the top dead center according to a low power with a predetermined low power distance;

calculating an entry detection position return time taking for the piston to return to the entry detection position according to the compression and expansion cycles; and decreasing the driving force of the linear motor when the entry detection position return time is greater than a predetermined criterion time per power, and increasing the driving force of the linear motor when the entry detection position return time is less than the criterion time in a control of the low power.

17. The control method of the linear compressor of claim 16, further comprising:

detecting a power consumption of the linear motor using a power detector; and decreasing the criterion time within a predetermined lower range when the detected power consumption of the linear motor is greater than a predetermined criterion power of the low power, and increasing the criterion time within a predetermined upper range when the detected power consumption of the linear motor is less than the predetermined criterion power of the low power.

18. The control method of the linear compressor of claim 16, further comprising stopping the driving of the linear motor when the near-collision position return time is greater than a predetermined driving stop duration that is greater than the predetermined allowance time, and resuming the driving of the linear motor after a predetermined stand-by time.

19. The control method of the linear compressor of claim 16, further comprising stopping the driving of the linear motor when the near-collision position return time is greater than a predetermined driving stop duration that is greater than the predetermined allowance time, and resuming the driving of the linear motor after a predetermined stand-by time.

20. The control method of the linear compressor of claim 16, further comprising detecting a position of the piston using a core, wherein the near-collision detector detects whether the piston passes the near-collision position by detecting the position of the core.

21. The control method of the linear compressor of claim 16, further comprising detecting a position of the piston using a core, wherein the near-collision detector detects whether the piston passes the near-collision position by detecting the position of the core.

22. The control method of the linear compressor of claim 16, further comprising detecting a position of the piston using a core, wherein the entry position detector detects whether the piston passes the entry detection position by detecting the position of the core.

* * * * *